(12) United States Patent
Leßmann et al.

(10) Patent No.: US 11,567,501 B2
(45) Date of Patent: Jan. 31, 2023

(54) METHOD AND SYSTEM FOR FUSING OCCUPANCY MAPS

(71) Applicant: APTIV TECHNOLOGIES LIMITED, St. Michael (BB)

(72) Inventors: Stephanie Leßmann, Erkrath (DE); Uri Iurgel, Wuppertal (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 311 days.

(21) Appl. No.: 16/854,380

(22) Filed: Apr. 21, 2020

(65) Prior Publication Data
US 2020/0363809 A1 Nov. 19, 2020

(30) Foreign Application Priority Data

May 13, 2019 (EP) ..................... 19174053

(51) Int. Cl.
| | |
|---|---|
| *G05D 1/02* | (2020.01) |
| *B60W 30/09* | (2012.01) |
| *B60W 40/02* | (2006.01) |
| *B60W 40/08* | (2012.01) |

(52) U.S. Cl.
CPC ........... *G05D 1/0214* (2013.01); *B60W 30/09* (2013.01); *B60W 40/02* (2013.01); *B60W 2040/0881* (2013.01)

(58) Field of Classification Search
CPC .... G05D 1/0214; B60W 30/09; B60W 40/02; B60W 40/04; B60W 60/001; B60W 2040/0881; G06T 7/187; G06T 11/001; G01C 21/32; G01C 21/38; G01S 2013/9323; G01S 13/931; G01S 13/726
See application file for complete search history.

(56) References Cited

U.S. PATENT DOCUMENTS

| | | | |
|---|---|---|---|
| 9,020,637 B2 * | 4/2015 | Schnittman | G05D 1/0227 382/106 |
| 2014/0350839 A1 * | 11/2014 | Pack | G05D 1/0274 901/1 |

(Continued)

OTHER PUBLICATIONS

Ganesan Varadarajan et al: "Robust underwater obstacle detection and collision avoidance", Autonomous Robots, Kluwer Academic Publishers, Dordrecht, NL, vol. 40, No. 7, Dec. 29, 2015, pp. 1165-1185, XP036070642, ISSN: 0929-5593, DOI: 10.1007/S10514-015-9532-2 [retrieved on Dec. 29, 2015].

(Continued)

*Primary Examiner* — Angelina Shudy
(74) *Attorney, Agent, or Firm* — Carlson, Gaskey & Olds, P.C.

(57) ABSTRACT

A method for fusing a first occupancy map and a second occupancy map comprises: determining at least one fusion parameter representing a potential dissimilarity between the first occupancy map and the second occupancy map and determining a fused occupancy map representing free and occupied space around the vehicle. The fused occupancy map is determined based on the first occupancy map, the second occupancy map, and a fusion rule. The fusion rule is configured to control the influence of the first occupancy map and/or the second occupancy map on the fused occupancy map based on the at least one fusion parameter.

20 Claims, 7 Drawing Sheets

(56) References Cited

U.S. PATENT DOCUMENTS

| | | | |
|---|---|---|---|
| 2016/0082597 A1* | 3/2016 | Gorshechnikov | G06F 16/29 901/1 |
| 2016/0378115 A1 | 12/2016 | Yoo | |
| 2017/0157769 A1* | 6/2017 | Aghamohammadi | B25J 9/1664 |
| 2017/0197311 A1* | 7/2017 | Garcia | G01S 15/931 |
| 2018/0216942 A1* | 8/2018 | Wang | G01C 21/32 |
| 2018/0300560 A1* | 10/2018 | Westerhoff | G06T 7/269 |
| 2018/0300561 A1* | 10/2018 | Steyer | G06V 20/58 |
| 2019/0087667 A1* | 3/2019 | Foroughi | G06N 20/00 |
| 2019/0303759 A1* | 10/2019 | Farabet | G06F 9/455 |
| 2020/0104613 A1* | 4/2020 | Hirai | G06V 10/48 |
| 2020/0183003 A1* | 6/2020 | Lee | G01S 13/931 |
| 2020/0183011 A1* | 6/2020 | Lin | G01C 21/3881 |
| 2020/0249356 A1* | 8/2020 | Huang | G01S 17/42 |
| 2020/0310753 A1* | 10/2020 | Radu | G06V 10/803 |
| 2021/0027117 A1* | 1/2021 | McGavran | G01C 21/32 |
| 2021/0101624 A1* | 4/2021 | Philbin | B60W 60/0016 |
| 2021/0118184 A1* | 4/2021 | Pillai | G06T 7/50 |
| 2021/0131823 A1* | 5/2021 | Giorgio | G01S 17/931 |
| 2021/0179142 A1* | 6/2021 | Horibe | B60W 60/00182 |
| 2021/0270633 A1* | 9/2021 | Tomono | G08G 1/16 |
| 2021/0279841 A1* | 9/2021 | Liu | G06N 3/0454 |
| 2021/0347378 A1* | 11/2021 | Nabatchian | G06V 10/82 |
| 2021/0354725 A1* | 11/2021 | King | B60W 40/06 |
| 2022/0030759 A1* | 2/2022 | Rovira Mas | G05D 1/0255 |
| 2022/0057232 A1* | 2/2022 | Shen | G01C 21/3881 |
| 2022/0117456 A1* | 4/2022 | Xue | G01C 21/387 |
| 2022/0147053 A1* | 5/2022 | Lin | G01C 21/32 |
| 2022/0196828 A1* | 6/2022 | Sorrentino | G06N 7/005 |
| 2022/0196829 A1* | 6/2022 | Chen | G06N 7/005 |
| 2022/0258738 A1* | 8/2022 | Jia | B60W 30/14 |
| 2022/0274601 A1* | 9/2022 | Jia | B60W 60/001 |
| 2022/0276654 A1* | 9/2022 | Lee | G05D 1/0214 |
| 2022/0291692 A1* | 9/2022 | Drinkard | G06N 3/008 |
| 2022/0308205 A1* | 9/2022 | Roesler | G01S 7/415 |

OTHER PUBLICATIONS

Yin Peng et al: "Stabilize an Unsupervised Feature Learning for LiDAR-based Place Recognition", 2018 IEEE/RSJ International Conference on Intelligent Robots and Systems (IROS), IEEE, Oct. 1, 2018, pp. 1162-1167, XP033490805, DOI: 10.1109/IROS.2018. 8593562 [retrieved on Dec. 27, 2018].

Extended European Search Report for Application No. EP 19 17 4053 dated May 5, 2019.

* cited by examiner

METHOD AND SYSTEM FOR FUSING OCCUPANCY MAPS

CROSS REFERENCE TO RELATED APPLICATION

This application claims priority to European Patent Application No. 19174053.9, filed on May 13, 2019.

FIELD

The present disclosure relates to methods for fusing occupancy maps in the context of controlling vehicles. An occupancy map represents free and occupied space around a vehicle on which basis one or more driver assist functions of the vehicle can be enabled, for example in an automatic driving application.

BACKGROUND

Sensors mounted on a vehicle are used in automotive applications to generate an occupancy map of the vehicle's environment. For example, radar sensors and/or lidar (light detection and ranging) sensors are used to provide sequences of measurements from which one or more occupancy maps are determined, each of the occupancy maps representing free and occupied space around a vehicle at a given time instance. These occupancy maps summarize the information of potential space that the vehicle can use without a collision with other objects or boundaries. The occupancy maps are therefore important for providing automatic and in particular autonomous driving applications.

One aspect is that the sensors mounted on the vehicle can usually only capture a small portion of the current environment per time step. Therefore, it is usually required to build up an occupancy map from multiple sensor measurements over time. This can generally be done by fusing occupancy maps from different time instances, thereby fusing the information from different sensor measurements in the same domain, namely occupancy-map domain. In particular, a recursive approach can be taken, wherein an occupancy map from a current sensor measurement is fused with an occupancy map from one or more previous sensor measurements. The influence of previous sensor measurements, i.e. occupancy maps will then gradually decay with each update of a new sensor measurement.

It has been noted that fusing occupancy maps can result in blurred occupancy maps. This is to say that areas of free and occupied space which are encoded in a given occupancy map do not have clear boundaries, but are inconsistently fading out. This makes it difficult to decide on the true boundaries between free and occupied space. The blurring effect can arise in various traffic situations, including dynamic as well as static conditions of motion. Having regard to the recursive fusion approach the blurring effect can be particularly prominent as inconsistencies can accumulate over time. Correction of such inconsistencies requires many new updates from new occupancy maps, which leads to the blurring effect.

Accordingly, there is a need for an improved fusion of occupancy maps.

SUMMARY

In one aspect, the present disclosure is directed at a computer implemented method for fusing a first occupancy map and a second occupancy map, the first occupancy map representing free and occupied space around a vehicle at a first time instance and the second occupancy map representing free and occupied space around the vehicle at a second time instance, the method comprising: determining at least one fusion parameter representing a potential dissimilarity between the first occupancy map and the second occupancy map; and determining a fused occupancy map representing free and occupied space around the vehicle, wherein the fused occupancy map is determined on the basis of the first occupancy map and the second occupancy map by means of a fusion rule, the fusion rule being adapted to control the influence of the first occupancy map and/or the second occupancy map on the fused occupancy map based on the at least one fusion parameter.

The potential dissimilarity can be for example an expected range of deviation between the first and second occupancy map. The potential dissimilarity can be influenced by various factors such as motion of the vehicle, reliability of the underlying sensor measurements, and/or other boundary conditions. It has been found that the potential degree of dissimilarity has an effect on the blurring effect that is notable in occupancy maps being fused by conventional fusion rules. In order to mitigate this effect, it is proposed to carry out the fusion by applying a fusion rule that is configured by a specific fusion parameter. The fusion parameter takes into account the potential dissimilarity and thus enables appropriate control of the fusion. For example, if the second time instance is a current time instance and the first time instance is a previous time instance, the influence of the second occupancy map can be increased relative to the first occupancy map if there is a high potential dissimilarity. This means that the weight of the current occupancy map is strengthened relative to the previous occupancy map. This can be done, e.g., by applying suitable weightings and/or offsets to the first and/or second occupancy map, wherein this step is controlled by said fusion parameter.

The term potential dissimilarity means that the first and second occupancy map are not necessarily dissimilar but they can be more or less dissimilar within expected bounds. The potential dissimilarity can be for example expressed in statistical terms, for example by providing a figure of variance of similarity, e.g., an expected deviation or error between the first and second map. As such, the term potential dissimilarity can also be understood as an expected dissimilarity. It is also understood that dissimilarity is inverse to similarity so that similarity effectively provides the same information as dissimilarity, but corresponding transformation rules may be necessary.

The fusion rule provides an adaptive fusion approach, which allows determining the fused occupancy map with at least a reduced blurring effect, thereby obtaining a more precise view on the environment of the vehicle. Automatic driving applications based on the fused occupancy map can be assumed to be more reliable and safe.

The first and second time instances can generally be different, wherein the second time instance can be later than the first time instance. The fusion parameter can generally be determined for a third time instance, which can also correspond to the time instance of the fused occupancy map. In a particular example, the third time instance can be equal to the second time instance.

As will also become more apparent in the following, the first and second occupancy maps can be part of a sequence of occupancy maps. In a particular example, the second occupancy map can be formed recursively from the first occupancy map, wherein the second occupancy map forms a new first occupancy map for determining a new fused occupancy map, and so forth.

In general, the first and second occupancy map can be based on sensor measurements of the vehicle, for example radar and/or lidar measurements. Other sensor measurements, for example single or multiple images (video) can also be used to determine the occupancy maps. Determining the first and second occupancy maps can be part of the method. However, the occupancy maps can also be provided from other sources via a network.

The fusion rule can be defined by one or more algebraic operations, e.g. addition, subtraction, and/or multiplications. In one example, the first and second occupancy maps are added, which is one example of a fusion. Other examples will become apparent from the detailed description further below.

In one aspect, the fusion parameter is determined on the basis of an estimated motion of the vehicle with respect to the first occupancy map and/or the second occupancy map. It has been found that the estimated motion can have a large impact on the potential dissimilarity between subsequent occupancy maps. The estimated motion can be given as a function of space within the occupancy map, for example as a function of coordinates of the occupancy map. Therefore, the spatial effect of the estimated motion with respect to the occupancy map is precisely taken into account, thereby enhancing the accuracy of the fusion. At least a portion of the estimated motion can be provided by sensor measurements of the vehicle or can be estimated as part of the method disclosed herein.

In another aspect, the step of determining the fusion parameter comprises that an expected error of the estimated motion of the vehicle is taken into account in dependence of the estimated motion. The expected error can be a predetermined expected error variance of the estimated motion, which can be, e.g. due to the limited accuracy of the sensors used for estimating the motion. The expected error can thus be known a-priori, for example from a specification of the sensors. In general, the expected error can be regarded as a measure for the limited validity of the estimated motion. As another example, the expected error can be associated with a drift of a coordinate system in which the motion of the vehicle is measured. The drift of the coordinate system can thus be one source of dissimilarity between the first and second occupancy grid map.

The estimated motion of the vehicle can generally comprise an estimated linear velocity of the vehicle and/or an estimated yaw rate of the vehicle. Taking into account both figures leads to a better fusion result as the various complex motion scenarios can be captured well by linear velocity and yaw rate. For this reason the estimated motion can be limited to these figures so as to improve the computational efficiency of the method. Linear velocity can be regarded as the velocity that is assumed to happen along a straight line. This can be, for example, measured by the number of wheel revolutions per time span, assuming that the vehicle drives on a straight lane, i.e. along a linear course. In contrast, yaw rate represents the degree of steering, e.g., while driving along a curvilinear course.

In a further aspect, the fusion parameter is determined on the basis of a plurality of predetermined calculation rules, each of the calculation rules being associated with a predetermined condition of the estimated motion of the vehicle. For determining the fusion parameter a respective one of the calculation rules is selected, wherein the respective calculation rule is selected with respect to the estimated motion of the vehicle meeting the predetermined condition that is associated with the respective calculation rule. In other words, one of the calculation rules is selected if the condition matches with the current estimate of the motion. This approach is both efficient and flexible, while also allowing for an increasing quality of the fusion.

The calculation rules can comprise at least a first calculation rule and a second calculation rule, wherein the first calculation rule is associated with a first condition of the estimated motion in which the vehicle is assumed to move along a non-linear course, and wherein the second calculation rule is associated with a second condition of the estimated motion in which the vehicle is assumed to move along a linear course. Distinguishing between these conditions has been found to be effective, wherein the non-linear motion condition may be regarded as steering or curve condition and the linear motion condition may be regarded as a situation in which the vehicle moves essentially in a straight direction. The different conditions can be, for example, distinguished on the basis of the yaw rate, i.e. the yaw rate can essentially be zero in the linear motion condition, and essentially non-zero in the non-linear motion condition. A threshold and/or a threshold-based hysteresis may be used to ensure a stable selection between the calculation rules.

The calculation rules can also comprise a third calculation rule being associated with a third condition of the estimated motion in which the vehicle is assumed not to move or to move with a velocity below a predetermined threshold. This can be interpreted as a low-velocity condition. It has been found that despite the low extent of motion the potential dissimilarity between the occupancy maps can still be high. This is because the limited accuracy of the sensor measurements, which form the basis of the occupancy maps, can become dominant, for example with respect to measuring angles in radar measurements.

The third calculation rule can be selectable from at least two calculation rules, which are not necessarily limited to one of said first and second calculation rules. However, it is understood that the plurality of calculation rules can be formed by said first, second, and third calculations rules, which has been found to effectively cover most of the relevant motion scenarios of vehicles. The number of calculation rules can also be limited to two, i.e. to the first and second calculation rules.

In another aspect, said third calculation can have priority over the first calculation rule and second calculation rule. This is to say that the third rule can be selected if the associated low-velocity condition is fulfilled and regardless of whether one of the further conditions is fulfilled. This can be done by checking the conditions in a predetermined order, wherein the condition of the third rule is checked first.

As an alternative to the third calculation rule at least one of the calculation rules, i.e. the first and/or the second calculation rules can comprise an offset term which is non-zero if the vehicle is assumed not to move or to move with a velocity below a predetermined threshold (low-velocity condition). The offset term can for example be generally added to the result of the first and/or second calculation rules but it influences the result due to non-zeroness only when the low-velocity condition is fulfilled. Therefore, the offset term can be configured such that a desired output is only provided in a predetermined range of velocity values. The number of calculation rules and corresponding checks of velocity conditions can thus be reduced.

In a further aspect, the fusion rule is adapted such that the influence of one of the first and second occupancy map on the fused occupancy map is increased relative to the influence of the other one of the first and second occupancy map in dependence of the potential dissimilarity between the first occupancy map and the second occupancy map, wherein the dissimilarity is represented by the fusion parameter. In this case, the fused occupancy map represents the free and occupied space around the vehicle at a third time instance being closer or equal to the respective first or second time instance being associated with the one of the first and second occupancy map. The dependence of the potential dissimilarity for increasing the influence of the other occupancy map can be linear or non-linear.

In yet another aspect, the first occupancy map is divided into a plurality of cells, each of the cells being associated with a probabilistic value representing a ratio between the probability that the respective cell is occupied and the probability that the respective cell is free, wherein the second occupancy map and the fused occupancy map are structured corresponding to the first occupancy map, i.e. both the second map and the fused map are also divided into a plurality of cells with probabilistic values.

The probabilistic values can generally be values that represent one or more probabilities or other types of likelihoods, which means that the occupancy map is structured in a statistical sense. In particular, the probabilistic values can be so-called log-odds or log-odd ratios, wherein a log-odds or log-odd ratio is defined as the logarithm of a ratio between a probability and one minus that probability, wherein the ratio can also be inverted. The probability can be defined with respect to the occupancy of a given cell (free or occupied). Using log-odds or log-odd ratios as probabilistic values provides several benefits, for example in view of computational efficiency because the probabilistic values can then be processed in an additive way rather than by using multiplications. However, the logarithmic treatment is not mandatory. This is to say that, e.g., odd ratios can be used instead of log-odd ratios if desired.

Having further regard to the cell-based structuring of the occupancy by probabilistic values it can be provided that a plurality of fusion parameters are used for determining the fused occupancy map, wherein each of the fusion parameters is determined per cell of the fused occupancy map, i.e. each or at least some of the cells are associated with a respective fusion parameter that is individually determined for the respective cell. The fusion rule can then be adapted to determine the probabilistic values of the fused occupancy map per cell by fusing pairs of probabilistic values in dependence of the fusion parameters, one member of a respective pair being a probabilistic value of a first cell of the first occupancy map and another member of the respective pair being a probabilistic value of a second cell of the second occupancy map, the first and second cell sharing a positional property with respect to the space around the vehicle. A respective probabilistic value of the fused occupancy map which is determined by fusing the probabilistic values of the respective pair (i.e. a fused value) is associated with a respective cell of the fused occupancy map which shares the positional property of the first and second cell.

The first and second cells and the respective cell of the fused map can all have the same relative position within their occupancy maps, thereby sharing the same positional property. In this context, all occupancy maps can have the same size, i.e. the same arrangement and number of cells. It is understood that by fusing cells having the same positional property occupancy maps are fused with spatial coherence, wherein the fusion parameters per cell ensure a consistent accuracy in the desired fusion behavior. The fusion is then spatially consistent. It is understood that dynamic differences within the vehicle's environment are thus taken into account. For example, due to the current motion of the vehicle, some portions of the first and second occupancy maps may well be expected to be quite similar, wherein other portions are probably not quite matching. However, by fusing with spatial resolution, i.e. by using fusion parameters per cell, a desired fusion behavior can still be ensured.

In a further aspect, a respective one of the fusion parameters can be calculated for one of the cells of the fused occupancy map, wherein the respective fusion parameter is adopted for a subset of the cells without calculating the fusion parameters for the subset, wherein the respective cell and each of the cells of the subset approximately have the same distance to the vehicle. Saying in other words, the fusion parameters do not have to be calculated for each cell but can at least partially be determined by reusing a fusion parameter of another cell. In this way, computational efficiency can be increased substantially.

In another aspect, the present disclosure is directed at a method for controlling a vehicle on the basis of occupancy maps, the method comprising: determining a raw sequence of occupancy maps on the basis of consecutive sensor measurements, each of the sensor measurements capturing at least a portion of the vicinity of the vehicle and each the occupancy maps representing free and occupied space around the vehicle, wherein the occupancy maps of the raw sequence are associated with consecutive time instances; determining a filtered sequence of occupancy maps, wherein at least one member of the filtered sequence is a fused occupancy map determined by fusing two occupancy maps on the basis of said raw sequence of occupancy maps in accordance with the method of an embodiment of the fusion method described herein; and controlling the vehicle on the basis of the filtered sequence including said fused occupancy map.

Determining the filtered sequence can comprise fusing pairs of first and second occupancy maps, wherein these occupancy maps form or are part of the raw sequence. A recursive determination of the first and second maps can be provided as indicated further above, which is a very efficient way of processing the data over time.

The sensor measurements can be captured by radar-sensor technology, lidar and/or other suitable sensing technology for obtaining "electronic views" on the surrounding of the vehicle.

In another aspect, the present disclosure is directed at a computer system for fusing occupancy maps, the computer system being configured to fuse occupancy maps by carrying out several or all steps of the computer implemented method described herein. The computer system can be part of a vehicle.

The computer system can comprise an input for receiving sensor measurements and an output for providing at least a fused occupancy map. The sensor measurements can be captured by the types of technologies stated further above. The output can be connected to another computer system arranged in the vehicle, thereby broadcasting the fused map to systems which may use this information. The fused map may also be broadcasted via a wireless network to other vehicles located in the vicinity. Spatial information on the environment can thus be distributed between different vehicles.

The computer system may comprise a processing unit, at least one memory unit and at least one non-transitory data storage. The non-transitory data storage and/or the memory unit may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
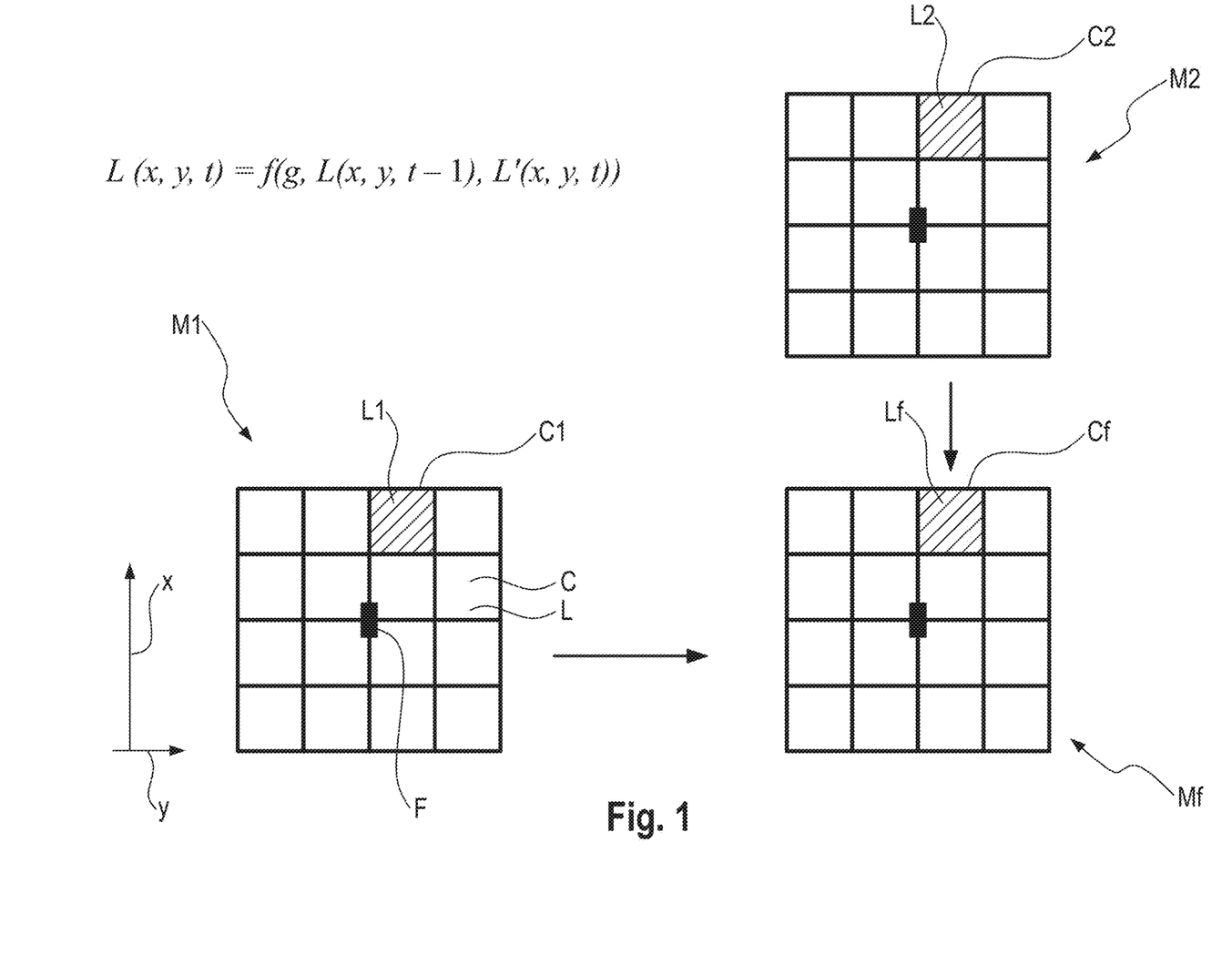
FIG. 1—aspects of a method for fusing occupancy maps.

FIG. 1 depicts a first occupancy map M1, a second occupancy map M2, and a fused occupancy map Mf, wherein these occupancy maps have the same size and are structured correspondingly into a plurality of cells C. The rectangular shape of the occupancy maps M2, M2, Mf and the rectangular shape of the cells C is merely an example, and other shapes such as circular or trapezoidal shapes are also possible.

The first occupancy map M1 is associated with a first time instance t1=t−1, and the second occupancy maps M2 is associated with a second time instance t2=t. Therefore, the first map M1 and the second map M2 form consecutive maps over time.

Each of the occupancy maps M1, M2, Mf represents free and occupied space around a vehicle F, which is virtually centered within the maps M1, M2, Mf and indicated as a solid rectangle within the maps. Each of the cells C of all of the maps M1, M2, Mf is associated with a probabilistic value L, which can be a logarithmic ratio between the probability that the underlying cell C is occupied and the probability that the respective cell is free. The value L can thus be a so called log-odds ratio.

The fused occupancy map Mf is obtained by fusing the first occupancy map M1 and the second occupancy maps M2, wherein fusing is carried out per cell C. As an example for fusing, a first cell C1 of the first occupancy map M1 and a second cell C2 of the second occupancy maps M2 are considered. Both cells C1 and C2 form a pair of cells C sharing the same relative position within the underlying occupancy maps M1 and M2. Having regard to a common x-y-coordinate system depicted beside the first occupancy map M1, the position of the cells C1, C2 can be expressed in coordinates, namely (x,y)=(2,1). The cells C1 and C2 are associated with probabilistic values L1 and L2, respectively. These values L1, L2 are fused by means of a fusion rule in order to obtain the fused probabilistic value Lf for the fused cell Cf, wherein the fused cell Cf has the same relative position as the first cell C1 and the second cell C2.

The fusion rule can be defined by at least one mathematical, e.g. arithmetic or algebraic operation and can include a sum of the first probabilistic value L1 and the second probabilistic value L2. The fusion is controlled by a fusion parameter g, i.e. the parameter g controls the influence of the values L2 and L2 on the fused value Lf. The fusion rule can be applied to the probabilistic values L of all cells, wherein, however, the fusion parameter g may vary between at least some cells.

The fusion rule can generally be expressed as depicted in FIG. 1, wherein the function f has arguments g, L(x,y,t−1), and L'(x,y,t), which are the fusion parameter, a probabilistic value from the first occupancy map M1, and a probabilistic value from the second occupancy map M2, respectively. In one example, the arguments can be g, L1, and L2, wherein the fusion parameter g can be determined for the respective cell (x,y)=(2,1). So in general, g=g(x,y). The fused probabilistic value L(x,y,t) can be associated with the second time instance t2=t and can be equal to Lf for the cell (2,1). It is understood that all values L of the cells can be fused in the same manner and that the fusion rule of FIG. 1 is recursive because L(x,y,t) will be L(x,y,t−1) for the next time step t+1. The term L'(x,y,t) can thus be regarded as an update.

The fusion parameter g generally represents a potential dissimilarity between the first and second occupancy maps M1, M2, wherein, if the fusion parameter g is determined per cell, the fusion parameter per cell represents the potential or expected dissimilarity between a pair of cells C from the first and second maps M1, M2, respectively, e.g. the dissimilarity between the values L1 and L2 of the cells C1 and C2.

In one example, the fusion rule can be $$L(x,y,t)=L(x,y,t-1)-\text{sign}(L(x,y,t-1))*g+L'(x,y,t),$$

wherein it is assumed that the probabilistic values L are limited to the range [−1,1]. It is then understood that the more dissimilarity is expected the higher the value g, so that the values L(x,y,t−1) are pulled towards zero. Therefore, the influence of the previous values L(x,y,t−1) is reduced in proportion to the expected dissimilarity. Within the recursive formula this means that the decay of previous values L(x, y,t−1), i.e. the "loss of memory", is reinforced the more dissimilarity is expected. It is understood that different fusion rules can be formulated having the same or similar effects.

Figure 2:
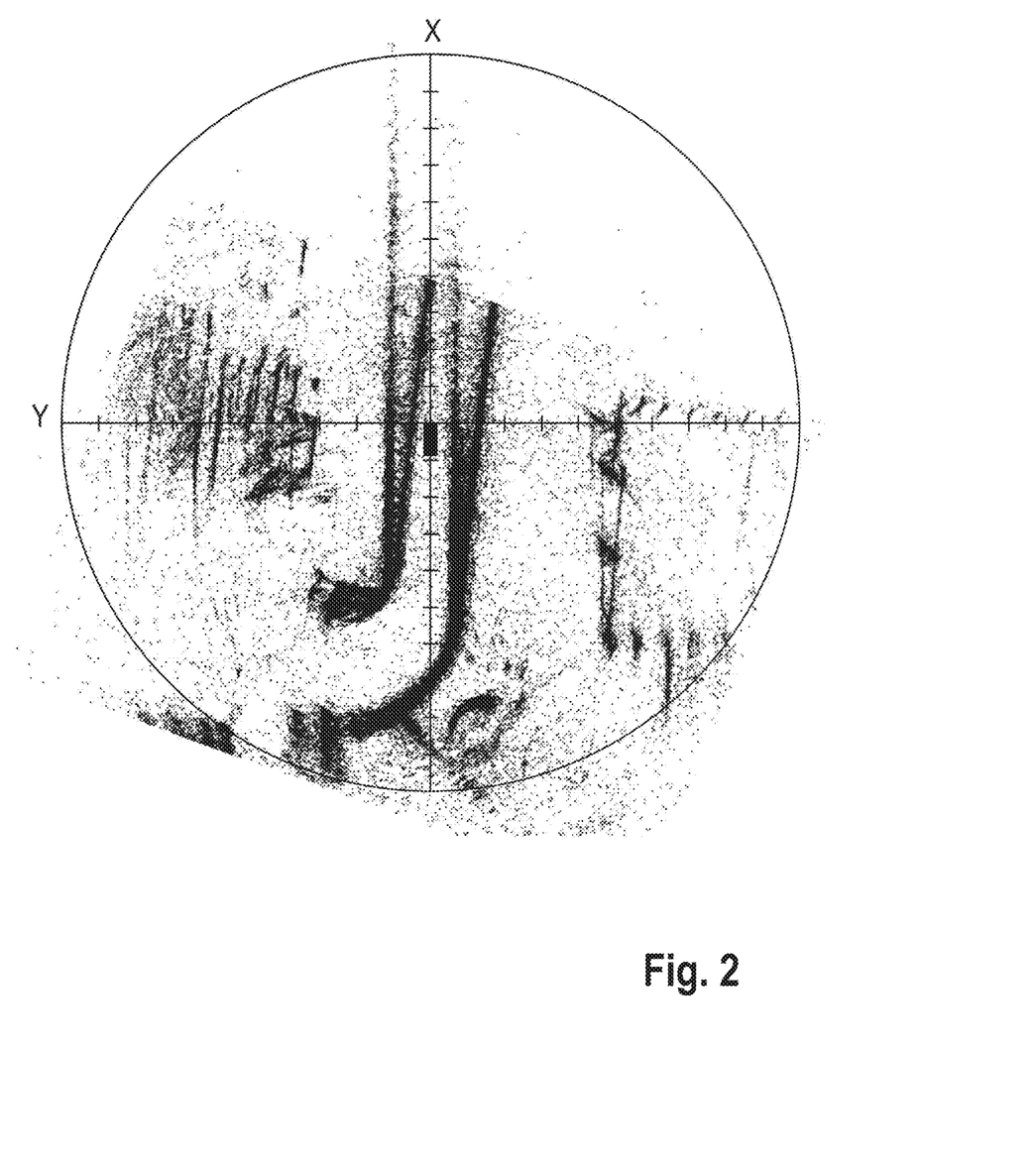
FIG. 2—an occupancy map being fused by means of a conventional fusion rule with respect to an average motion condition of the vehicle.

FIG. 2 depicts an exemplary graph of a fused occupancy map, wherein a conventional fusion rule is used for fusing a plurality of occupancy maps being captured while the vehicle indicated at the center of the graph was driving at normal speed along a curvy road. The conventional fusion rule has a constant decay of previous values, for example $$L(x,y,t)=(1-a)*L(x,y,t-1)+a*L'(x,y,t), \quad (5)$$

wherein a is a constant, i.e. a(x,y,t)=a for all x, y, and t. As can be seen, the map of FIG. 2 is blurred. While a road structure can be roughly identified, the boundary of the road is ambiguous due to the blurring effect.

Figure 3:
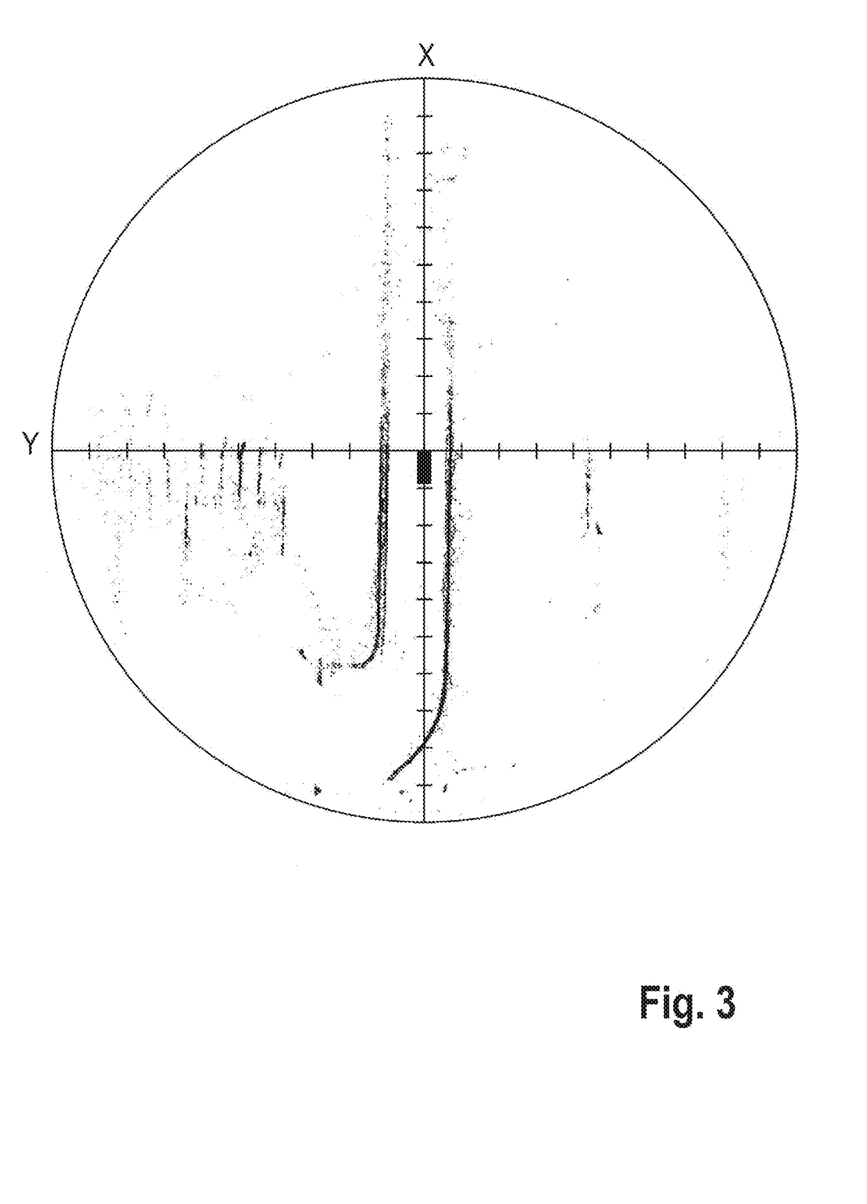
FIG. 3—an occupancy map being fused by means of a fusion rule according to an embodiment with respect to an average motion condition of the vehicle.

FIG. 3 depicts an exemplary graph of a fused occupancy map, wherein a fusion rule according to an embodiment is used for fusing the occupancy maps from the same sensor measurements that are underlying the fused occupancy map of FIG. 2. The fusion rule is adapted to control the decay of the previous values $L(x,y,t-1)$ by means of the fusion parameter g, which represents how dissimilar these values are expected to be with respect to the current values $L'(x,y,t)$. As a result, the occupancy map of FIG. 3 is not blurred and the road structure can be clearly identified.

Figure 4:
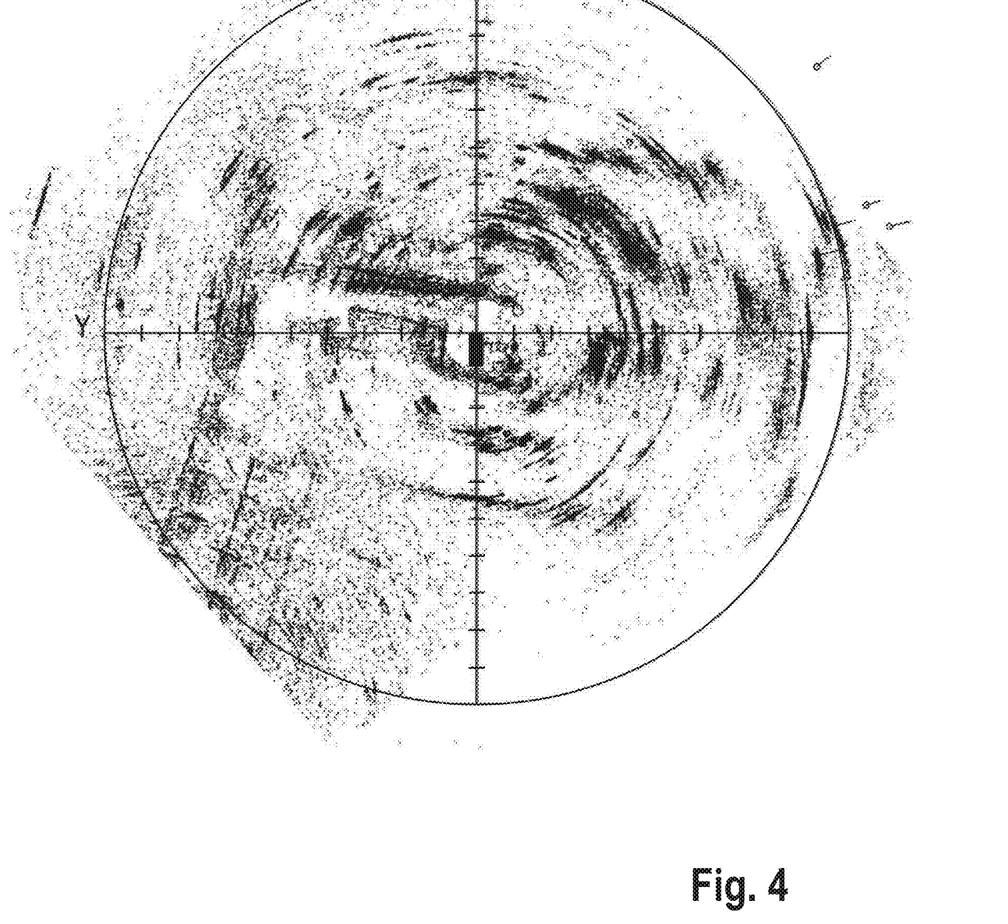
FIG. 4—an occupancy map being fused by means of a conventional fusion rule with respect to a low velocity condition of the vehicle.

FIG. 4 depicts a further exemplary graph of a fused occupancy map, wherein the same conventional fusion rule as in FIG. 2 was used. However, the underlying occupancy maps are obtained in a low velocity condition of the vehicle, i.e. the vehicle did no move while consecutive sensor measurements were obtained for determining the occupancy maps. As can be seen from FIG. 4, circular artifacts are visible. These artifacts result from an error variance of the underlying sensor measurements becoming dominant. In particular, radar sensor measurements usually have a high error variance with respect to the detected angle.

Figure 5:
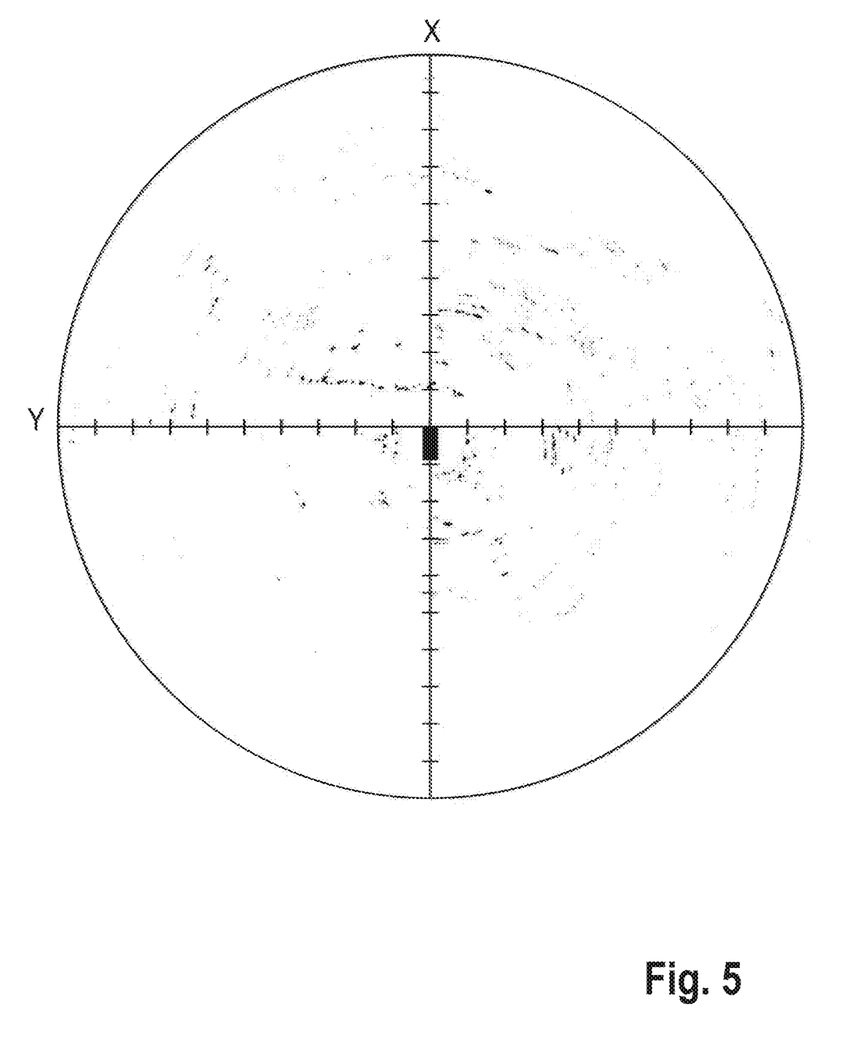
FIG. 5—an occupancy map being fused by means of a fusion rule according to an embodiment with respect to a low velocity condition of the vehicle.

FIG. 5 depicts a further exemplary graph of a fused occupancy map, wherein a fusion rule according to an embodiment was used for fusing the occupancy maps from the same sensor measurements that are underlying the fused occupancy map of FIG. 4. As a result, the occupancy map of FIG. 5 is not blurred by circular artifacts and structures in the space around the vehicle centered in the map can be clearly identified.

Aspects of determining the fusion parameter can described using the following relationships.

$$p_{xy} = \begin{bmatrix} p_x \\ p_y \end{bmatrix} = R_\phi \left( \begin{bmatrix} p'_x \\ p'_y \end{bmatrix} - \begin{bmatrix} T_x \\ T_y \end{bmatrix} \right)$$

$$R_\phi = \begin{bmatrix} \cos(\phi) & -\sin(\phi) \\ \sin(\phi) & \cos(\phi) \end{bmatrix}$$

The position of a respective cell C of an occupancy map, e.g. cell C2 from the map M2 of FIG. 1, is denoted as $p_{xy}$, wherein $p_x$ is the position with respect to the x-dimension and $p_y$ is the position with respect to the y-dimension, see the coordinate system in FIG. 1. The variables $T_x$, $T_y$, $R_\phi$, and $\phi$ denote the current vehicle translation per x and y direction, the rotation matrix and the current heading change of the vehicle, respectively. It is understood that $p_x$, $p_y$ represent the position of a cell C after the previous position $p'_x$, $p'_y$ of the same cell C has undergone translational motion $T_x$, $T_y$ and rotational motion $R_\phi$.

In a motion condition in which the vehicle is assumed to move in a non-linear (i.e., curvilinear) direction, the yaw rate w of the vehicle is expected to be non-zero, i.e. $\omega \neq 0$. The following set of equations for the translational motion and the heading can then be applied $$T_x = \frac{v}{\omega} \cdot \sin(\phi)$$

$$T_y = \frac{v}{\omega} \cdot (1 - \cos\phi)$$

$$\phi = \omega \Delta_t$$

wherein $\Delta_t$ denotes the time span for making the heading change, i.e. the rotational movement, and v is the linear velocity.

A further set of equations can be applied for obtaining the expected error variances $\Delta_{px}$ and $\Delta_{py}$ of the estimated motion per x and y direction $$\Delta_{p_x} = \sqrt{\left(\frac{\partial p_x}{\partial \omega}\right)^2 \cdot \Delta_\omega^2 + \left(\frac{\partial p_x}{\partial v}\right)^2 \cdot \Delta_v^2}$$

$$\Delta_{p_y} = \sqrt{\left(\frac{\partial p_y}{\partial \omega}\right)^2 \cdot \Delta_\omega^2 + \left(\frac{\partial p_y}{\partial v}\right)^2 \cdot \Delta_v^2}$$

wherein $\Delta_\omega$ and $\Delta_v$ denote the expected error variances of the estimated yaw rate $\omega$ and the estimated linear velocity v, respectively. These expected error variances $\Delta_\omega$ and $\Delta_v$ can be known a-priori, for example from a known specification of the sensors used for measuring the yaw rate $\omega$ and the velocity v.

Another set of equations represents the partial derivatives of the cell position $p_{xy}$ with respect to yaw rate $\omega$ and velocity v. The following equations are understood in view of the above equations.

$$\frac{\partial p_{xy}}{\partial \omega} = \frac{\partial}{\partial \omega} R_\phi \begin{bmatrix} p_x \\ p_y \end{bmatrix} - \frac{\partial}{\partial \omega} R_\phi \begin{bmatrix} T_x \\ T_y \end{bmatrix}$$

$$= \Delta_t \begin{bmatrix} -y \cdot \cos(\omega\Delta_t) - x \cdot \sin(\omega\Delta_t) \\ -y \cdot \cos(\omega\Delta_t) + x \cdot \sin(\omega\Delta_t) \end{bmatrix} + \frac{v}{w^2} \cdot$$

$$\begin{bmatrix} -\sin(\omega\Delta_t) + 2\cos(\omega\Delta_t)\sin(\omega\Delta_t) + \\ \omega\Delta_t(\cos(\omega\Delta_t) + 4\cos^2(\omega\Delta_t) - 2) \\ \cos(\omega\Delta_t) + 2\cos^2(\omega\Delta_t) + \\ \omega\Delta_t(\sin(\omega\Delta_t) - 4\sin(\omega\Delta_t)\cos(\omega\Delta_t)) + 1 \end{bmatrix}$$

$$\frac{\partial p_{xy}}{\partial v} = -\frac{\partial}{\partial v} RT$$

$$= -\frac{1}{v} \cdot RT + \frac{1}{\omega}$$

$$\begin{bmatrix} -\sin(\omega\Delta_t)(\cos(\omega\Delta_t) - 1) - \cos(\omega\Delta_t)\sin(\omega\Delta_t) \\ -\sin(\omega\Delta_t)^2 + \cos(\omega\Delta_t)(\cos(\omega\Delta_t) - 1) \end{bmatrix}$$

The next equation defines the joint expected error variance $\Delta_{pxy}$ with respect to the error variances per dimension, i.e. $\Delta_{px}$ and $\Delta_{py}$.

$$\Delta_{p_{xy}} = \sqrt{\Delta_{p_x}^2 + \Delta_{p_y}^2}$$

$$= \sqrt{\left(\frac{\partial p_x}{\partial \omega}\right)^2 \cdot \Delta_\omega^2 + \left(\frac{\partial p_x}{\partial v}\right)^2 \cdot \Delta_v^2 + \left(\frac{\partial p_y}{\partial \omega}\right)^2 \cdot \Delta_\omega^2 + \left(\frac{\partial p_y}{\partial v}\right)^2 \cdot \Delta_v^2}$$

The partial derivatives can be calculated by using the two previous. The expected error variance $\Delta_{pxy}$ represents a potential dissimilarity of the current cell position $p_{xy}$ with respect to a previous cell position.

The three preceding equations can be used in combination as part of a first calculation rule for determining the fusion parameter g under a non-linear velocity condition of the vehicle.

When considering a linear velocity condition (i.e., ω=0) the partial derivatives can be expressed by $$\frac{\partial p_{xy}}{\partial \omega} = \begin{bmatrix} x - v\Delta_t \\ y \end{bmatrix}$$

$$\frac{\partial p_{xy}}{\partial v} = \begin{bmatrix} -\Delta_t \\ 0 \end{bmatrix}$$

which gives $$\Delta p_{xy} = \sqrt{\Delta_\omega^2 \cdot (x-v\Delta_t)^2 + \Delta_v^2 \Delta_t^2 + \Delta_\omega^2 y^2}$$

$$\Delta p_{xy} = |\Delta_v \Delta_t|$$

for calculating the expected error variance $\Delta_{pxy}$ for the linear velocity condition.

One of the two preceding equations, preferably the shorter one, can be used as part of a second calculation rule for determining the fusion parameter g under a linear velocity condition of the vehicle.

For determining the fusion parameter g a mapping or scaling function can be applied to the expected error variance $\Delta_{pxy}$. The mapping function can be the same for both velocity conditions and is preferably part of said first and second calculation rules.

The mapping function can be defined as:

$$g = \min(\max(\Delta_{pxy} * s, \text{gmin}), \text{gmax}),$$

wherein min( ), and max( ) identify the minimum and maximum values from two arguments, and wherein s is a scaling factor, and wherein gmin and gmax are predefined minimum and maximum values for the fusion parameter g. So in general, the mapping function can be nonlinear for improved robustness. However, linear mapping function may also be used where appropriate.

Figure 6:
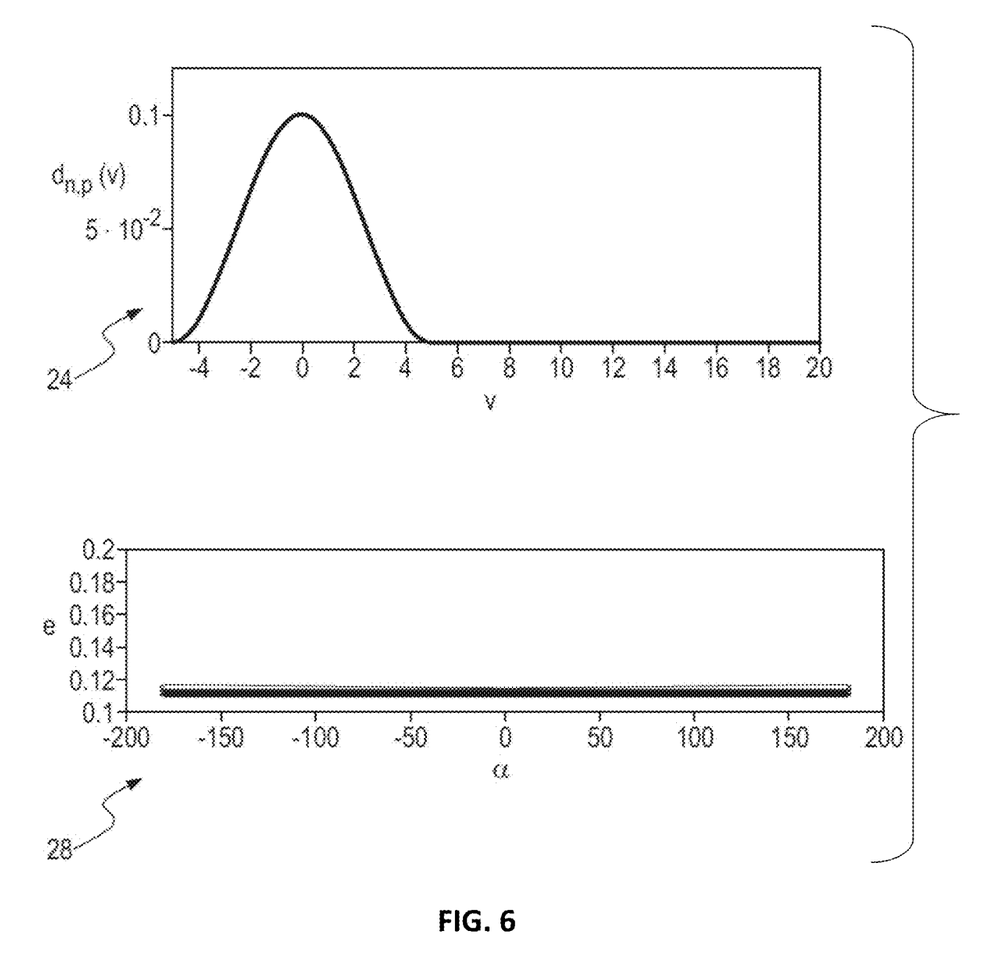
FIG. 6—aspects of determining a fusion parameter for a low-velocity condition and a graph showing an estimated error for different angles.

In a low velocity condition, which is fulfilled when the linear velocity v is below a threshold p, an offset becomes non-zero, which can be defined by this equation $$d_{n,p}(v) = \begin{cases} \frac{2n}{p^3}v^3 - \frac{3n}{p^2}v^2 + n & \text{if } |v| \leq p \\ 0 \end{cases}$$

wherein the offset $d_{n,p}$ is used as a summand for g, i.e. $g + d_{n,p}$, with n being a constant. A graphical representation of that equation is given in graph 24 of FIG. 6, wherein the horizontal axis represents the velocity v and the vertical axis represents the offset $d_{n,p}$. The offset $d_{n,p}$ is added to the fusion parameter g, which is calculated by one of the first calculation rule and the second calculation rule in dependence of their motion conditions.

Figure 7:
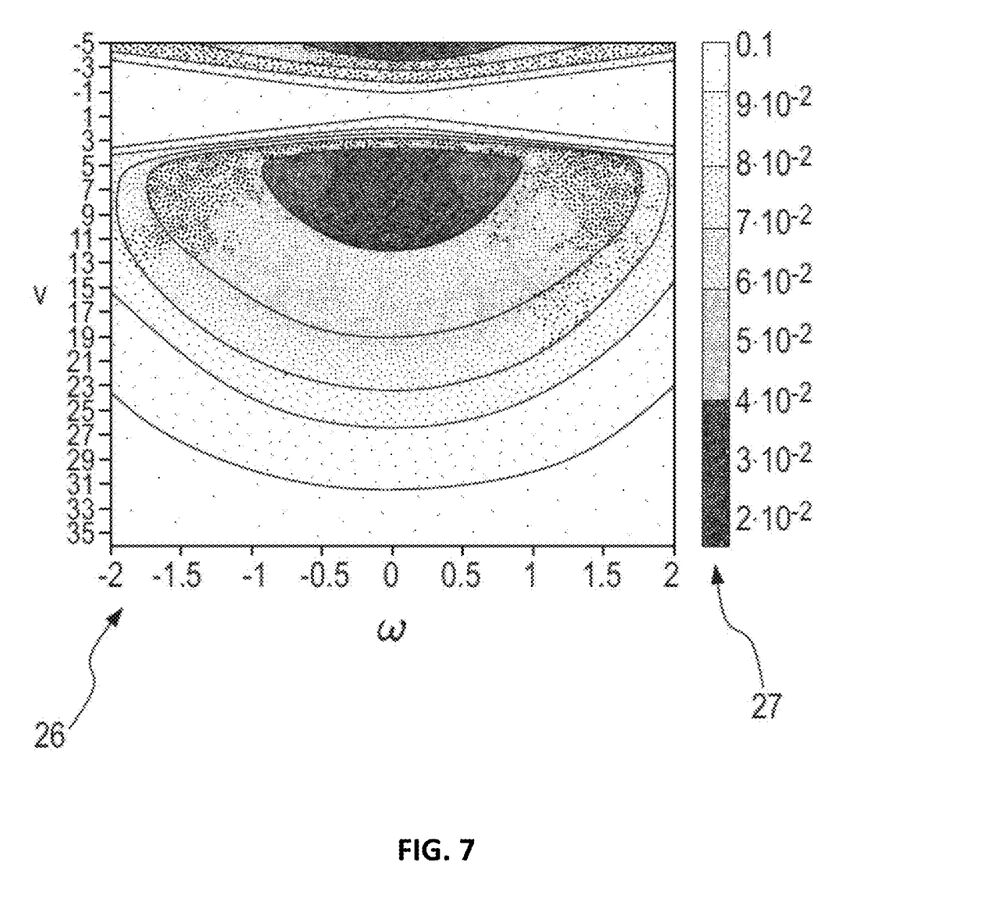
FIG. 7—a graph with a visual encoding of a fusion parameter with respect to motion of a vehicle.

As a mere example, a graph 26 shown in FIG. 7 gives a visual encoding of the fusion parameters g and d as calculated with the first, second, and third calculation rules. The horizontal axis of graph 26 denotes yaw rate w, and the vertical axis denotes velocity v. The grey values within the graph 26 represent the fusion parameter in accordance with the intensity bar 27. As can be seen, comparably low values around 0.03 for the fusion parameter g are obtained for low yaw rate ω and a velocity v between 5 m/s and 10 m/s, wherein the fusion parameter g gradually increases with higher yaw rate ω and velocity v, wherein a radial invariance characteristic can also be noted in graph 26. As an exception from this behaviour, for velocities below 5 m/s, in particular around 0 m/s, comparably high values are obtained for the fusion parameter, i.e. near 0.1.

Having regard to aspects of computational efficiency, reference is made to graph 28 of FIG. 6. It has been found that a fusion parameter that is determined for a given cell can be reused for other cells of an occupancy map, the other cells having approximately the same radial distance to the vehicle. For example, cell C1 of the first occupancy map M1 in FIG. 1 has a similar distance to vehicle F as the cell C indicated in the same occupancy map M1. In this case, it can be assumed that a fusion parameter which is valid for cell C1 is approximately also valid for cell C. In a particular example, fusion parameters are calculated for each x-value of the occupancy maps but not for the different y-values. Assuming the position of the cells C to be expressed, e.g., in Polar coordinates the fusion parameters are then also used for the other cells C in accordance with their radial distance to the vehicle F, i.e. the fusion parameter which is calculated for a given angle at a given radial distance is adopted for the cells C having the same radial distance but other angles. This can be done without making a significant error, as is illustrated in graph 28 in FIG. 6, wherein the horizontal axis represents the angle α and the vertical axis represents the expected error e.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:
1. A method, comprising:
obtaining a first occupancy map and a second occupancy map,
wherein:
each of the first occupancy map and the second occupancy map include a plurality of cells,
a position of each of the plurality of cells in the first occupancy map is the same as a position of a corresponding one of the plurality of cells in the second occupancy map,
the first occupancy map represents free and occupied space around a vehicle at a first time instance, and
the second occupancy map represents the free and occupied space around the vehicle at a second time instance;
determining at least one fusion parameter representing a potential dissimilarity between a respective one of the plurality of cells of the first occupancy map and the corresponding one of the plurality of cells of the second occupancy map;
determining a fused occupancy map representing the free and occupied space around the vehicle by fusing each of the plurality of cells of the first occupancy map with the corresponding one of the plurality of cells of the second occupancy map using a fusion rule, wherein the at least one fusion parameter controls an influence the respective one of the plurality of cells of the first occupancy map and/or the corresponding one of the plurality of cells of the second occupancy map has on the fused occupancy map; and controlling at least one function of the vehicle based on the fused occupancy map.

2. The method of claim 1, wherein determining the at least one fusion parameter is based on an estimated motion of the vehicle with respect to the first occupancy map and/or the second occupancy map.

3. The method of claim 2, wherein determining the at least one fusion parameter comprises taking an expected error of the estimated motion of the vehicle into account in dependence on the estimated motion.

4. The method of claim 2, wherein the estimated motion of the vehicle comprises an estimated linear velocity of the vehicle and/or an estimated yaw rate of the vehicle.

5. The method of claim 2, wherein
determining the at least one fusion parameter is based on a plurality of predetermined calculation rules,
each of the calculation rules is associated with a predetermined condition of the estimated motion of the vehicle,
a respective one of the calculation rules is selected for determining the at least one fusion parameter, and
the respective calculation rule is selected with respect to the estimated motion of the vehicle meeting the predetermined condition associated with the respective calculation rule.

6. The method of claim 5, wherein
the calculation rules comprise at least a first calculation rule and a second calculation rule,
the first calculation rule is associated with a first condition of the estimated motion in which the vehicle is assumed to move along a non-linear course, and
the second calculation rule is associated with a second condition of the estimated motion in which the vehicle is assumed to move along a linear course.

7. The method of claim 6, wherein the calculation rules comprise a third calculation rule associated with a third condition of the estimated motion in which the vehicle is assumed not to move or to move with a velocity below a predetermined threshold.

8. The method of claim 5, wherein at least one of the calculation rules comprises an offset term which is non-zero if the vehicle is assumed not to move or to move with a velocity below a predetermined threshold.

9. The method of claim 1, wherein
the fusion rule is configured such that the influence depends on the potential dissimilarity represented by the at least one fusion parameter, and
the fused occupancy map represents the free and occupied space around the vehicle at a third time instance being closer or equal to the respective first or second time instance associated with the one of the first and second occupancy map.

10. The method of claim 1, wherein
each of the plurality of cells is associated with a probabilistic value representing a ratio between a probability that the respective cell is occupied and a probability that the respective cell is free,
the fusion rule is adapted to determine the probabilistic values of the fused occupancy map per cell by fusing pairs of probabilistic values in dependence on the fusion parameters,
one member of a respective pair is the probabilistic value of respective one of the plurality of cells of the first occupancy map and another member of the respective pair is the probabilistic value of the corresponding one of the plurality of cells of the second occupancy map,
the respective one of the plurality of cells of the first occupancy map and the corresponding one of the plurality of cells share a positional property with respect to the space around the vehicle, and
a respective probabilistic value determined by fusing the probabilistic values of the respective pair is associated with a respective cell of the fused occupancy map sharing the positional property of the respective one of the plurality of cells of the first occupancy map and the corresponding one of the plurality of cells.

11. The method of claim 1, comprising:
determining a raw sequence of the first occupancy maps and the second occupancy maps on the basis of consecutive sensor measurements, associated with consecutive time instances;
determining a filtered sequence of occupancy maps, wherein at least one member of the filtered sequence is the fused occupancy map determined by fusing two of the occupancy maps of said raw sequence.

12. A computer system for fusing occupancy maps, the computer system being configured to fuse occupancy maps by carrying out the method of claim 1.

13. The computer system of claim 12, comprising an input for receiving sensor measurements and an output for providing at least the fused occupancy map.

14. A non-transitory computer readable medium comprising instructions for carrying out the method of claim 1.

15. The method of claim 1, wherein
determining the at least one fusion parameter comprises determining a plurality of fusion parameters;
one of the plurality of fusion parameters is associated with a subset of the plurality of cells of the first occupancy map and corresponding ones of the plurality of cells of the second occupancy map; and
the subset of the plurality of cells of the first occupancy map and corresponding ones of the plurality of cells of the second occupancy map are at approximately the same distance from the vehicle.

16. A system for fusing a first occupancy map representing free and occupied space around a vehicle at a first time instance and a second occupancy map representing the free and occupied space around the vehicle at a second time instance, each of the first occupancy map and the second occupancy map including a plurality of cells, a position of each of the plurality of cells in the first occupancy map is the same as a position of a corresponding one of the plurality of cells in the second occupancy map, the system comprising:
a processor and
memory associated with the processor,
wherein the processor is configured to:
determine at least one fusion parameter representing a potential dissimilarity between a respective one of the plurality of cells of the first occupancy map and the corresponding one of the plurality of cells of the second occupancy map;
determine a fused occupancy map representing the free and occupied space around the vehicle by fusing each of the plurality of cells of the first occupancy map with the corresponding one of the plurality of cells of the second occupancy map using a fusion rule, wherein the at least one fusion parameter controls an influence the respective one of the plurality of cells of the first occupancy map and/or the corresponding one of the plurality of cells of the second occupancy map has on the fused occupancy map; and control at least one function of the vehicle based on the fused occupancy map.

17. The system of claim 16, wherein the at least one fusion parameter is based on an estimated motion of the vehicle with respect to the first occupancy map and/or the second occupancy map, the at least one fusion parameter is determined based on a selected one of a plurality of predetermined calculation rules, each of the calculation rules is associated with a predetermined condition of the estimated motion of the vehicle, and the selected one of the calculation rules is selected based on the estimated motion of the vehicle meeting the predetermined condition associated with the selected one of the calculation rules.

18. The system of claim 17, wherein the calculation rules comprise at least a first calculation rule and a second calculation rule, the first calculation rule is associated with a first condition of the estimated motion in which the vehicle is assumed to move along a non-linear course, and the second calculation rule is associated with a second condition of the estimated motion in which the vehicle is assumed to move along a linear course.

19. The system of claim 18, wherein the calculation rules comprise a third calculation rule associated with a third condition of the estimated motion in which the vehicle is assumed not to move or to move with a velocity below a predetermined threshold.

20. The system of claim 17, wherein at least one of the calculation rules comprises an offset term which is non-zero if the vehicle is assumed not to move or to move with a velocity below a predetermined threshold.

* * * * *